US012256865B2

(12) United States Patent
Zakowski et al.

(10) Patent No.: US 12,256,865 B2
(45) Date of Patent: *Mar. 25, 2025

(54) FOOD PROCESSOR AND MODULAR LID ASSEMBLY THEREFOR

(71) Applicant: CONAIR CORPORATION, Stamford, CT (US)

(72) Inventors: Joseph W. Zakowski, Avon, CT (US); Bryan Hotaling, Harvard, MA (US); Matthew Naples, Acton, MA (US); John Macneill, Acton, MA (US)

(73) Assignee: CONAIR LLC, Stamford, CT (US)

( * ) Notice: Subject to any disclaimer, the term of this patent is extended or adjusted under 35 U.S.C. 154(b) by 1210 days.

This patent is subject to a terminal disclaimer.

(21) Appl. No.: 16/995,320

(22) Filed: Aug. 17, 2020

(65) Prior Publication Data

US 2021/0030208 A1 Feb. 4, 2021

Related U.S. Application Data

(63) Continuation of application No. 15/014,429, filed on Feb. 3, 2016, now Pat. No. 10,827,880.

(51) Int. Cl.
*A47J 43/07* (2006.01)
*A47J 43/046* (2006.01)

(52) U.S. Cl.
CPC ......... *A47J 43/0716* (2013.01); *A47J 43/046* (2013.01)

(58) Field of Classification Search
CPC .. A47J 43/0716; A47J 43/046; A47J 43/0788; A47J 43/06; A47J 43/0794; A47J 36/10; A47J 42/50; A47J 43/044; A47J 43/0705; A47J 43/0722; A47J 43/0761; A47J 43/0772; A47J 43/0777; A47J 43/085; A47J 43/255; A47J 44/00; B26D 7/0641; B26D 7/24; B26D 3/22; B26D 7/06; C07K 1/02; C07K 1/026; C07K 1/04; C07K 1/042; C12P 21/00; H01H 9/226; Y10S 16/13
USPC .......................................................... 99/510
See application file for complete search history.

(56) References Cited

U.S. PATENT DOCUMENTS

| | | | |
|---|---|---|---|
| 4,226,374 A | 10/1980 | Kafka | |
| 4,542,857 A | 9/1985 | Akasaka | |
| 4,614,306 A | 9/1986 | Doggett | |
| 4,819,882 A | 4/1989 | Stottmann et al. | |
| 7,047,872 B2 * | 5/2006 | Mulle | A47J 43/0788 241/37.5 |
| 7,252,252 B2 | 8/2007 | Mauch et al. | |
| 7,644,883 B2 | 1/2010 | Mauch et al. | |
| 7,673,823 B2 | 3/2010 | Mauch et al. | |
| 7,681,817 B2 | 3/2010 | Orent | |
| 7,708,215 B2 * | 5/2010 | Wang | A47J 43/0788 241/37.5 |
| 9,167,938 B2 | 10/2015 | Benoit et al. | |

(Continued)

*Primary Examiner* — Steven W Crabb
*Assistant Examiner* — Ket D Dang
(74) *Attorney, Agent, or Firm* — Grogan, Tuccillo & Vanderleeden LLP

(57) ABSTRACT

A food processor includes a base, a motor disposed within the base, a drive shaft operatively connected to the motor and extending outwardly from the base, the output shaft being rotatable upon actuation of the motor, a bowl mounted on the base for containing food items, a modular lid for covering the bowl and having an opening therein, and a removable attachment receivable by said opening.

13 Claims, 8 Drawing Sheets

(56) References Cited

U.S. PATENT DOCUMENTS

| | | | |
|---|---|---|---|
| 9,326,640 B2* | 5/2016 | Kikuchi | A47J 43/0716 |
| 10,154,759 B2* | 12/2018 | Zakowski | A47J 43/0705 |
| 2005/0056160 A1* | 3/2005 | Mulle | A47J 43/0788 |
| | | | 99/492 |
| 2006/0130676 A1* | 6/2006 | Cohen | A47J 19/027 |
| | | | 99/511 |
| 2007/0095959 A1 | 5/2007 | Narai | |
| 2010/0206701 A1* | 8/2010 | Ferraby | A47J 43/0794 |
| | | | 241/37.5 |
| 2013/0233952 A1 | 9/2013 | Pryor, Jr. | |
| 2014/0021278 A1* | 1/2014 | Armstrong | A47J 43/0788 |
| | | | 241/37.5 |
| 2014/0246529 A1* | 9/2014 | Kobos | A47J 43/07 |
| | | | 241/100 |
| 2014/0299692 A1* | 10/2014 | Zakowski | A47J 43/0716 |
| | | | 241/100 |
| 2014/0299693 A1* | 10/2014 | Zakowski | A47J 43/0716 |
| | | | 241/100 |
| 2014/0299698 A1* | 10/2014 | Zakowski | A47J 44/00 |
| | | | 241/100 |
| 2015/0037480 A1* | 2/2015 | Carlson | A47J 43/0794 |
| | | | 241/36 |
| 2015/0037840 A1 | 2/2015 | Carlson | |
| 2015/0041578 A1* | 2/2015 | Fung | A47J 43/07 |
| | | | 241/301 |

\* cited by examiner

FOOD PROCESSOR AND MODULAR LID ASSEMBLY THEREFOR

CROSS-REFERENCE TO RELATED APPLICATIONS

This application is a continuation application of, and claims the benefit of, U.S. application Ser. No. 15/014,429, filed on Feb. 3, 2016, which is hereby incorporated by reference herein in its entirety.

FIELD OF THE INVENTION

The present invention relates to food processors and, more particularly, to a modular lid assembly for a food processor.

BACKGROUND OF THE INVENTION

Food processing devices providing a number of different types of food preparations, such as mixing, grinding, chopping, slicing, grating, shredding, or other processing operations, are well known. Existing food processing devices typically include a base housing an electric motor, a drive shaft driven by the motor, a bowl receivable on the base and a lid or cover having a feed tube releasably mounted to the bowl. A rotatably driven blade is mounted to the drive shaft to process one or more food items inside the bowl.

While existing food processing devices are generally suitable for what is regarded as ordinary performance, there is room for improvement in terms of ease of use, expanded functionality and modularity. For example, existing food processing devices typically have a single size, fixed-position feed tube. While generally suitable for processing large food items, such feed tube may not be ideal for other processing operations, such as the spiral cutting of smaller food items, or for blending a fixed set of ingredients that are added directly to the bowl prior to processing.

SUMMARY OF THE INVENTION

It is an object of the present invention to provide a food processor.

It is another object of the present invention to provide a food processor having a modular lid assembly.

It is another object of the present invention to provide a food processor having a modular lid assembly that can be easily and quickly configured in dependence upon the type of processing operation to be carried out.

It is another object of the present invention to provide a food processor having a modular lid assembly that can be easily and quickly configured in dependence upon the size of food item to be processed.

These and other objects are achieved by the present invention.

According to an embodiment of the present invention, a food processor is provided. The food processor includes a base, a motor disposed within the base, a drive shaft operatively connected to the motor and extending outwardly from the base, the output shaft being rotatable upon actuation of the motor, a bowl mounted on the base for containing food items, a modular lid for covering the bowl and having an opening therein, and a removable attachment receivable by said opening.

According to another embodiment of the present invention, a modular lid for a food processor is provided. The modular lid includes a generally circular body configured to be received atop a bowl and an opening formed in the body. The opening is configured to allow passage of food items into the bowl and is further configured to removably receive one of a cover configured to completely close off the opening, a feed tube having a generally oval feed tube aperture, and a spiral feed tube having a generally cylindrical feed tube aperture.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
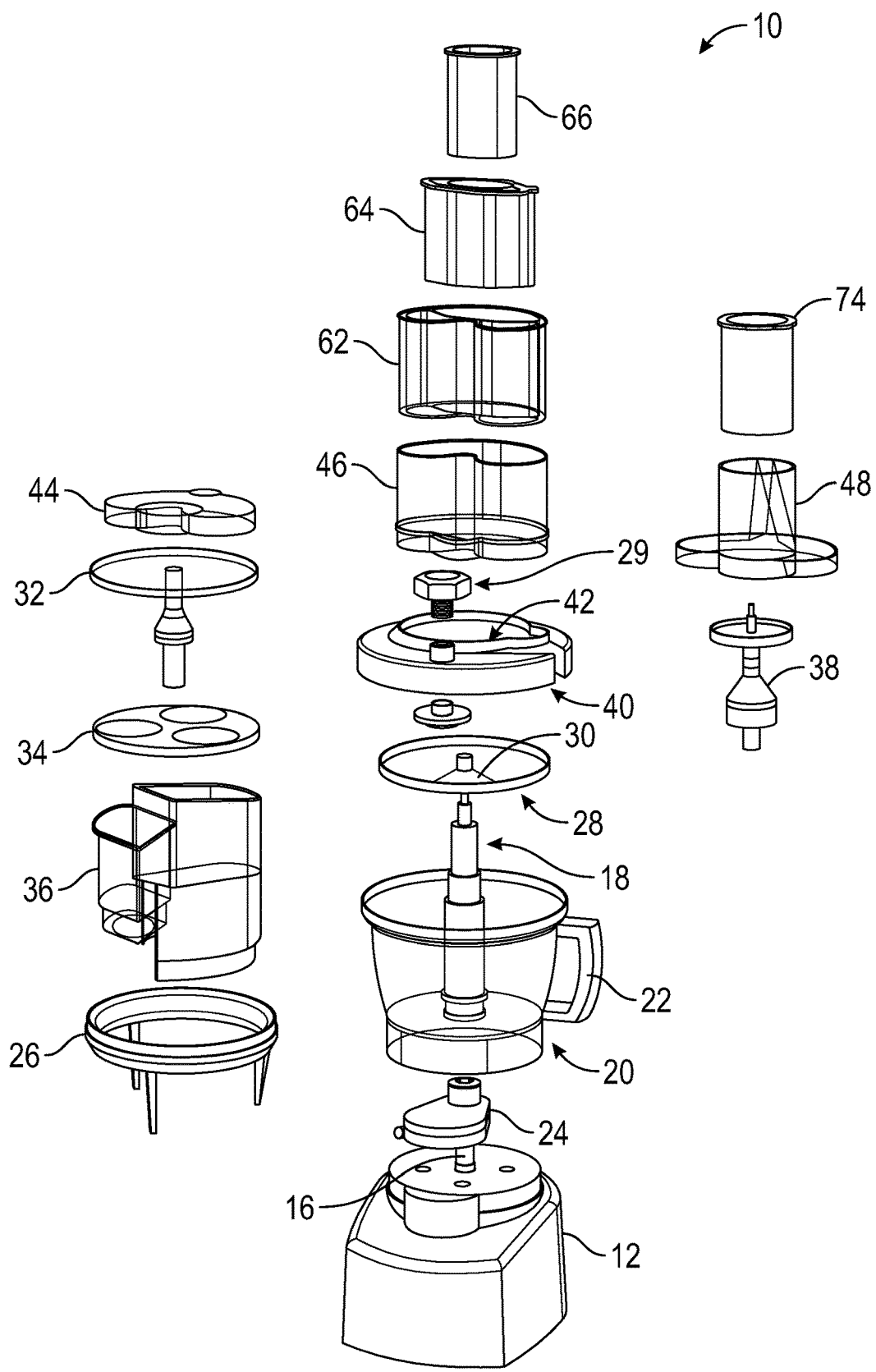
FIG. 1 is an exploded view of a food processor according to an embodiment of the present invention.

Referring to FIG. 1, a food processor 10 according to the present invention is shown. The food processor 10 includes base housing 12 having a motor (not shown) disposed within. The motor is preferably a conventional electric motor that is reversible and has a variable speed between approximately 500-3,500 RPM. The motor is operatively engaged with a drive shaft 16 to cause the drive shaft 16 to rotate. The motor is oriented such that the drive shaft 16 extends upwardly from the motor, extending outwardly and/or protruding from a top surface of the base housing 12. The base housing 12 may include a user interface electrically connected to the motor to enable a user to control the speed of the motor. As is known in the art, the user interface may include one or more knobs, dials, buttons, toggle switches or the like. A terminal end of the drive shaft 16 extends outwardly from the base housing and has a plastic adapter shaft 18 engageable and rotatable therewith. A distal end of the adapter shaft 18 includes a blade coupling configured to engage a cutting blade or other attachment, as discussed hereinafter.

Figure 2:
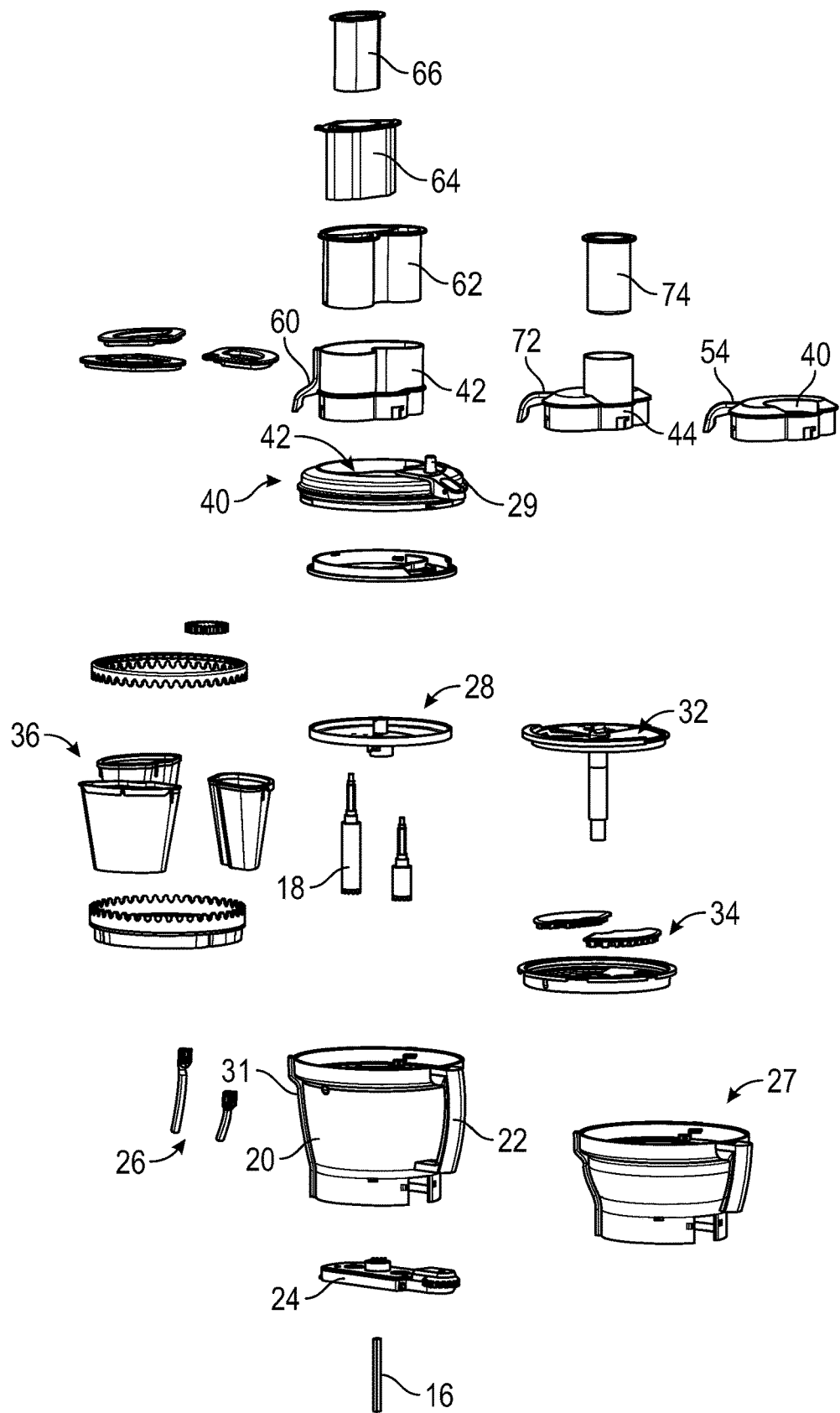
FIG. 2 is an exploded parts view of a food processor according to an embodiment of the present invention.

Referring to FIGS. 1-2, the food processor 10 also includes a bowl 20 removably securable on the base housing 12. Preferably, the bowl 20 has a plurality of protrusions that slidingly engage within corresponding slots in the base housing to retain the bowl 20 on the base housing 12. For example, the bowl 20 may be retained on the base 12 via a bayonet style coupling, as is known in the art, that resists forces in both the clockwise and counterclockwise directions. Extending upwardly from the center of the bottom wall of the bowl 20 is a generally cylindrical central tube sized to accommodate the drive shaft 16 therethrough when the bowl 20 is secured to the base housing 12 in an assembled position. A handle 22 is integrally molded to the sidewall of the bowl and extends outwardly therefrom, to provide the user with a gripping surface with which to pick up, carry, and otherwise handle the bowl 20. In an embodiment, the bowl 20 may also be provided with a slicing disc adjustment mechanism 24 configured to mate with the lower end of the adapter shaft 18 and operable from outside the bowl 20 by a user to vary the slice thickness of food items. In addition, the bowl 20 may be provided with a wiper element 26 having a plurality of scraper blades that contact the inner sidewall of the bowl 20. The wiper element 26 is selectively rotatable by a user about the inner periphery of the bowl 20, via rotation of a knob 29 accessible above the bowl 20, to scrape the sides of the bowl 20 during processing of food items.

As shown in FIG. 2, a smaller capacity bowl 27 may be mounted to the base 12 in lieu of the larger capacity bowl 20, such as when a smaller volume of food is to be processed. In an embodiment, the bowl 20 has a 16-cup capacity and the smaller bowl 27 has a 4-8 cup capacity.

As best shown in FIG. 2, the bowl 20 may also include an optical channel 31 on the periphery thereof. The optical channel 31 is configured to receive an optical signal generated by the control unit within the base 12 to ensure the bowl 20 is properly seated on the base 12, and a lid is properly seated on the bowl 20. For example, when an optical signal sent from the base is reflected and received back at the base by an optical sensor, this indicates that the base, bowl and lid are in proper position for food processing. This "optical interlock" ensures that the motor will not operate, and the processing tool will not rotate, unless the bowl and lid are in proper position.

Although the base housing 12 is shown as being generally square-shaped, it is within the spirit and scope of the present invention that the base housing 12 be of a different shape as long as the base housing 12 can still perform its intended functions, as described herein. Additionally, although the bowl 20 is shown as being removably retained at the top of the base housing 12, it is within the spirit and scope of the present invention that the base housing 12 be generally L-shaped when viewed from the side, such that the motor is disposed within the vertically-oriented portion and the bowl 20 is disposed on top of the horizontally-oriented portion.

As further shown in FIGS. 1 and 2, a cutting tool 28 is rotatably securable to the drive shaft 16. In particular, the cutting tool 28 is rotatably fixed to the adapter shaft 18 proximate the terminal end of the drive shaft 16 and is positioned within the bowl 20 above the top edge of the central tube, when in the assembled position. In an embodiment, the cutting tool 28 is a generally circular metallic disk having at least one slicing blade 30 formed therein as is well understood by those of ordinary skill in the art.

Alternatively, a dicing mechanism including a dicing blade 32 and a dicing plate 34 may be utilized in place of the cutting tool 28 in order to dice food items. In connection with the dicing mechanism, a plurality of indexing storage containers 36 may be inserted into the bowl 20 in nested position with the wiper element 26, below the dicing plate 34. The wiper element 26 may be selectively rotated by a user to index the storage containers 36 to a desired position beneath the dicing plate 34 to collect diced food items therein. In yet another embodiment, a spiral cutting blade assembly 38 may be utilized in place of the cutting tool 28 in order to cut food items into spiral shapes.

The food processor 10 further includes a lid 40 that is removably securable to a top of the bowl 20. The lid 40 defines a substantially circular body sized and dimensioned to cover the bowl 20, and has an opening 42 formed therein configured to receive one of a flat cover 44, a large feed tube 46 or a spiral feed tube 48, as best shown in FIGS. 3-8. The opening 42 in the lid may be generally oval or kidney shaped, although other shapes and dimensions are envisioned. As illustrated in FIGS. 1-8, and as discussed hereinafter, the flat cover 44, large feed tube 46 and spiral feed tube 48 each include a lower portion sized and shaped to be received in the opening 42, and a peripheral flange limiting the insertion depth of the respective flat cover 44, large feed tube 46 or spiral feed tube 48 into the opening 42 and preventing such components from falling into the bowl 20.

Figure 3:
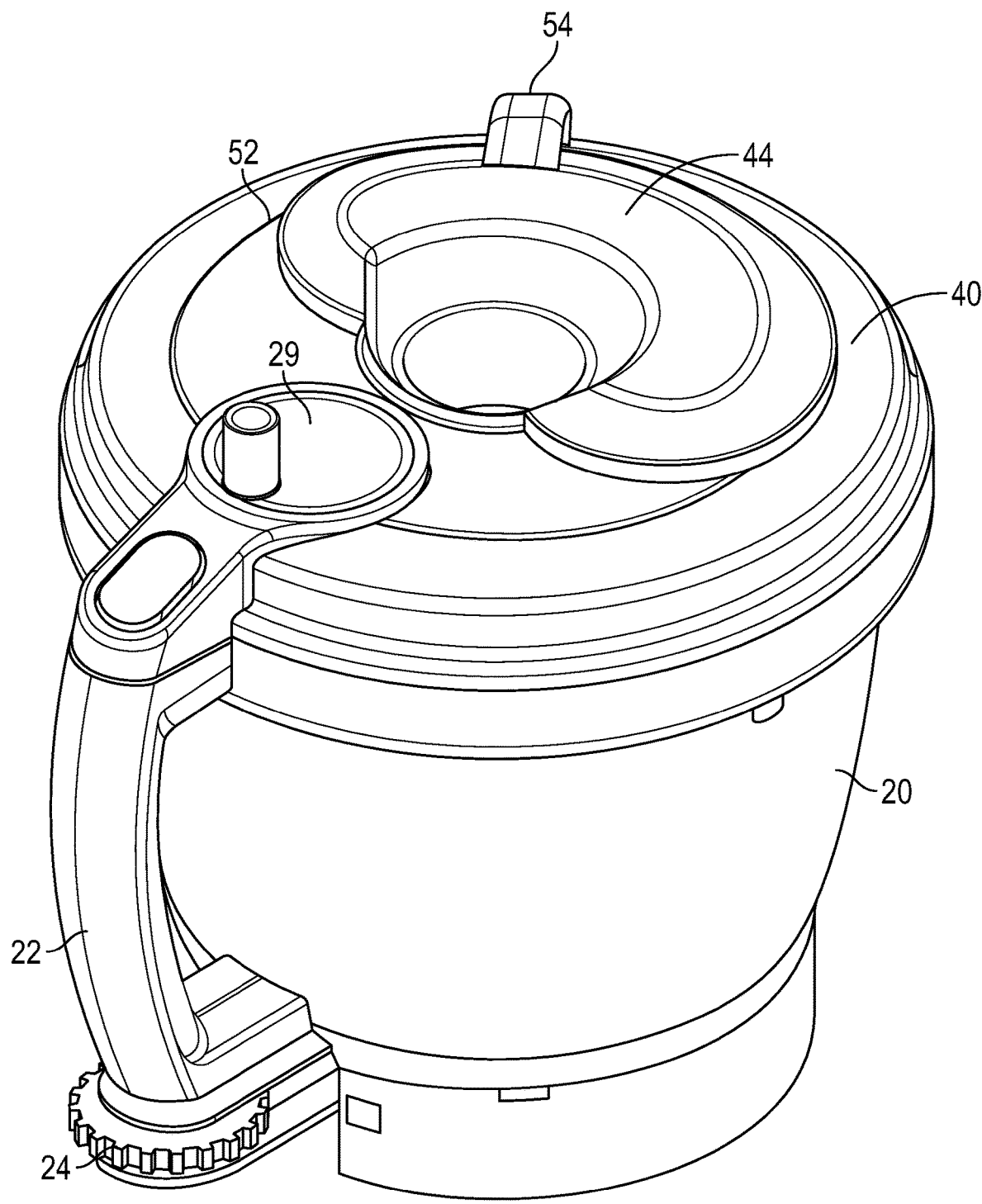
FIG. 3 is a perspective view of a processing bowl and modular lid therefor, utilized with a flat cover, according to an embodiment of the present invention.
Figure 4:
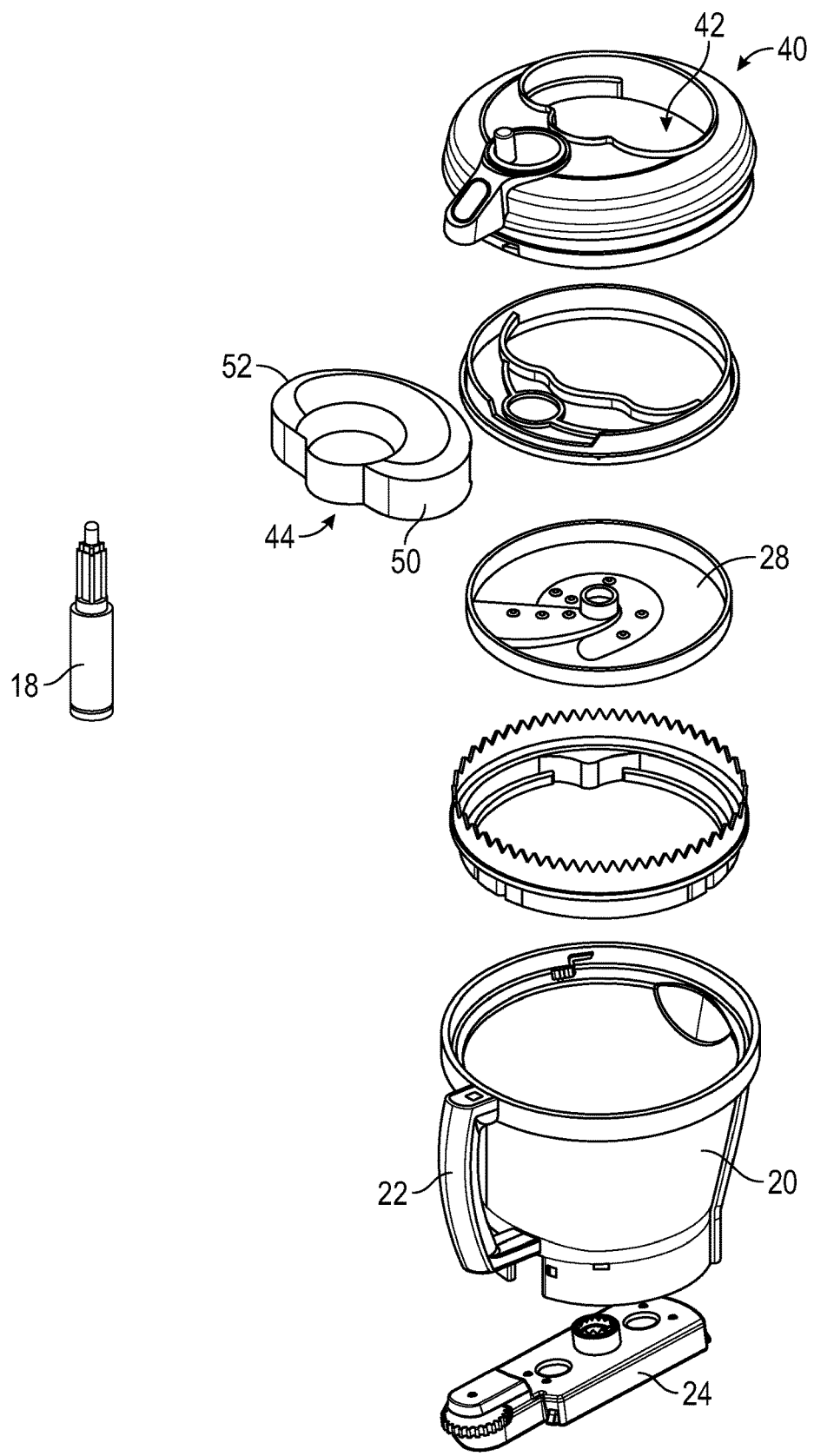
FIG. 4 is an exploded, perspective view of the food processing bowl, modular lid and flat cover of FIG. 3.

Turning now to FIGS. 3 and 4, the modular lid 40 is shown in use with the flat cover 44. As alluded to above, the flat cover 44 has a lower portion 50 sized and shaped to be received in the opening 42, and a peripheral flange 52 that contacts the top surface of the lid 40 to prevent the flat cover 44 from falling into the bowl 20. The flat cover 44 also includes an optical channel 54 that is configured to align with the optical channel 31 on the periphery of the bowl 20 when the flat cover is in place on the lid 40 and the lid 40 is in place atop the bowl 20. As alluded to above, alignment between the optical channel 54, optical channel 31 and the base 12 creates an "optical interlock," ensuring that the cover 44, lid 40 and bowl 20 are all in proper position for safe operation.

Figure 5:
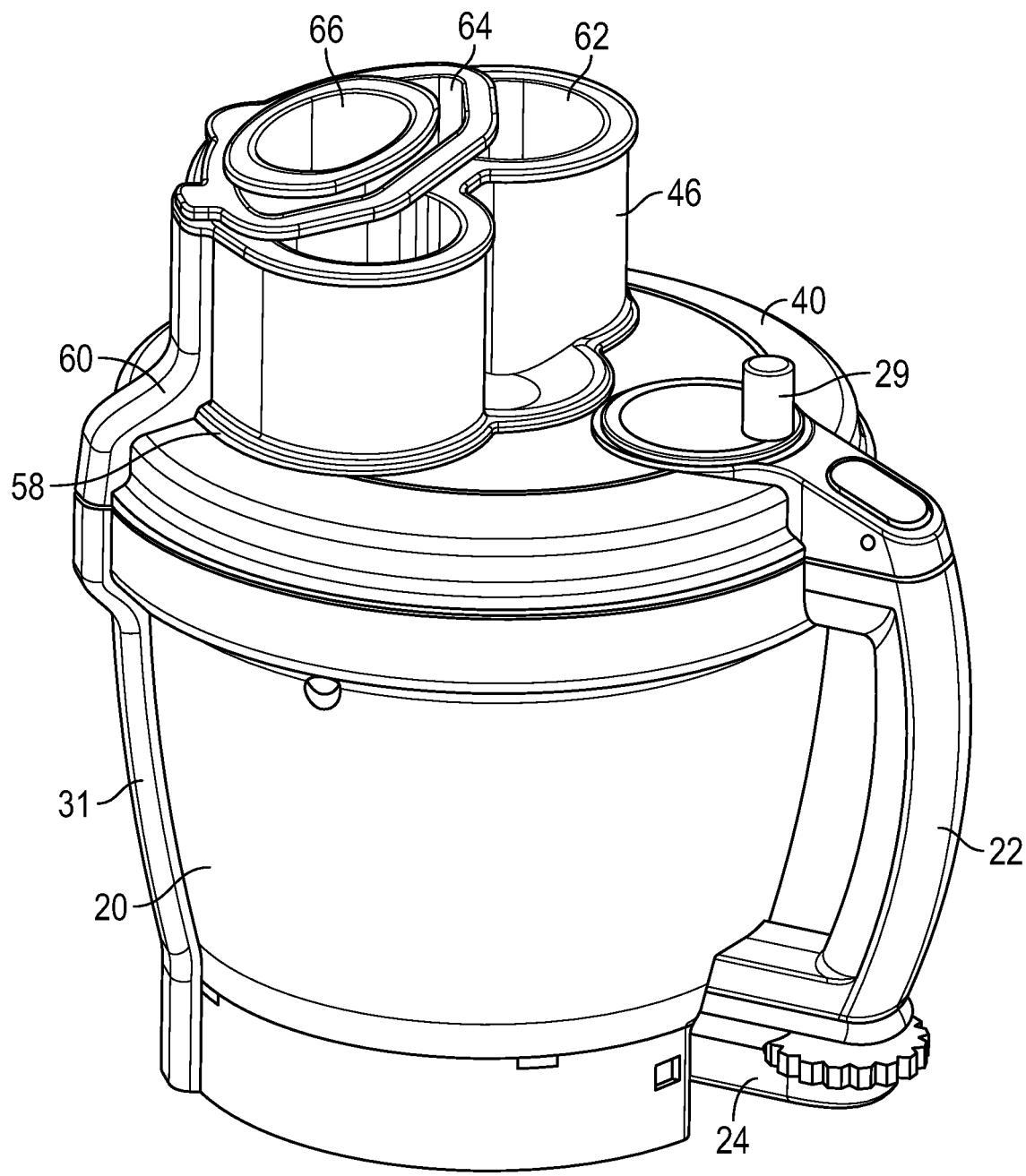
FIG. 5 is a perspective view of a processing bowl and modular lid therefor, utilized with a large feed tube, according to an embodiment of the present invention.
Figure 6:
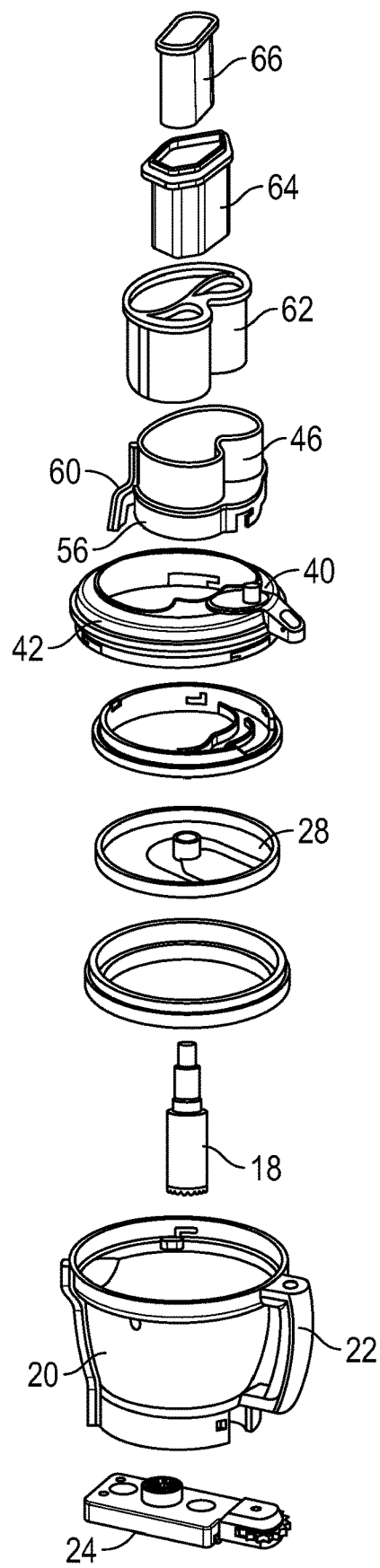
FIG. 6 is an exploded, perspective view of the food processing bowl, modular lid and large feed tube of FIG. 5.

With reference to FIGS. 5 and 6, the modular lid 40 is shown in use with the large feed tube 46. As alluded to above, the large feed tube 46 has a lower portion 56 sized and shaped to be received in the opening 42, and a peripheral flange 58 that contacts the top surface of the lid 40 to prevent the large feed tube 46 from falling into the bowl 20. A generally oval shaped opening extends through the feed tube 46 to allow for the insertion of food items to be processed. The large feed tube 46 similarly includes an optical channel 60 that is configured to align with the optical channel 31 on the periphery of the bowl 20 to establish the "optical interlock" in the manner discussed above.

As further illustrated in FIGS. 1, 2, 5 and 6, the large feed tube 46 includes a pusher assembly having a first pusher 62, a second pusher 64, and a third pusher 66. The first pusher 62 is sized and shaped so as to be slidably received by the feed tube 56 and may be utilized to push large food items through the feed tube 46 and into the cutting tool 28 or other processing implement within the bowl 20. The second pusher 64 is sized and shaped so as to be slidably received by an aperture in the first pusher 62 that defines a smaller feed tube opening. The second pusher 64 may be utilized when somewhat smaller food items are to be processed. For example, when processing somewhat smaller food items, the first pusher 62 may be inserted into the feed tube 46. In this position, the smaller aperture through the first pusher 62 defines the passageway into the bowl 20. The second pusher 64 may then be utilized to push the smaller food items through the aperture in the first pusher 62 and into the cutting tool 28 or other processing implement within the bowl 20.

Similarly, the third pusher 66 is sized and shaped so as to be slidably received by an aperture in the second pusher 64 that defines an even smaller feed tube opening. The third pusher 66 may be utilized when even smaller food items are to be processed. For example, when processing very small food items, the first pusher 62 may be inserted into the feed tube 46 and the second pusher 64 may then be inserted into the aperture in the first pusher 62. In this position, the small aperture through the second pusher 64 defines the passageway into the bowl 20. The third pusher 66 may then be utilized to push the small food items through the aperture in the second pusher 64 and into the cutting tool 28 or other processing implement within the bowl 20.

In this manner, a user may configure the feed tube 46 and pusher assembly to provide a feed tube opening that best matches the size of the food items to be processed. In particular, when processing food items with a small cross-sectional area such as celery or carrots, a large feed tube opening (having a cross sectional area much greater than that of the food items) is not ideal and can adversely impact processing performance. With the configurable feed tube 46, however, a user can easily vary the area of the feed tube opening to better match the thickness of the food items to be processed. More specifically, matching the feed tube opening area to the thickness of food items to be processed results in greater stability as the food items are pushed into the cutting tool. As a result, improved processing performance may be realized.

Importantly, each of the first, second and third pushers have a flange at the top thereof that prevents the pushers from falling through one another and into the bowl when in the nested configuration. Indeed, in the nested configuration shown in FIG. 5, the bottom of each pusher is generally coplanar. Preferably, the opening in the feed tube 46, first pusher 62 and second pusher 64 are generally the same shape but have decreasing cross-sectional areas. In the preferred embodiment, the openings are generally oval in shape.

Figure 7:
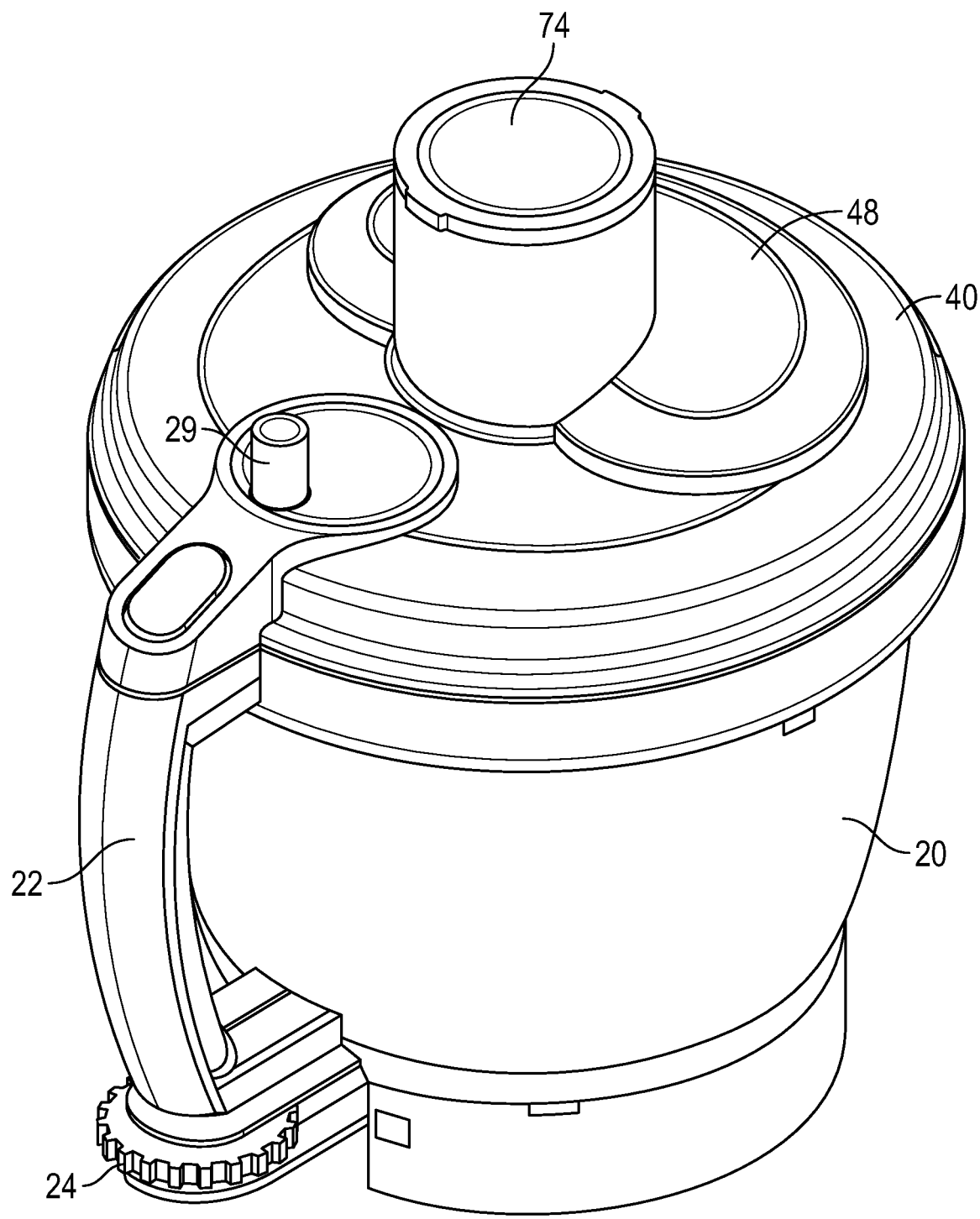
FIG. 7 is a perspective view of a processing bowl and modular lid therefor, utilized with a spiral feed tube, according to an embodiment of the present invention.
Figure 8:
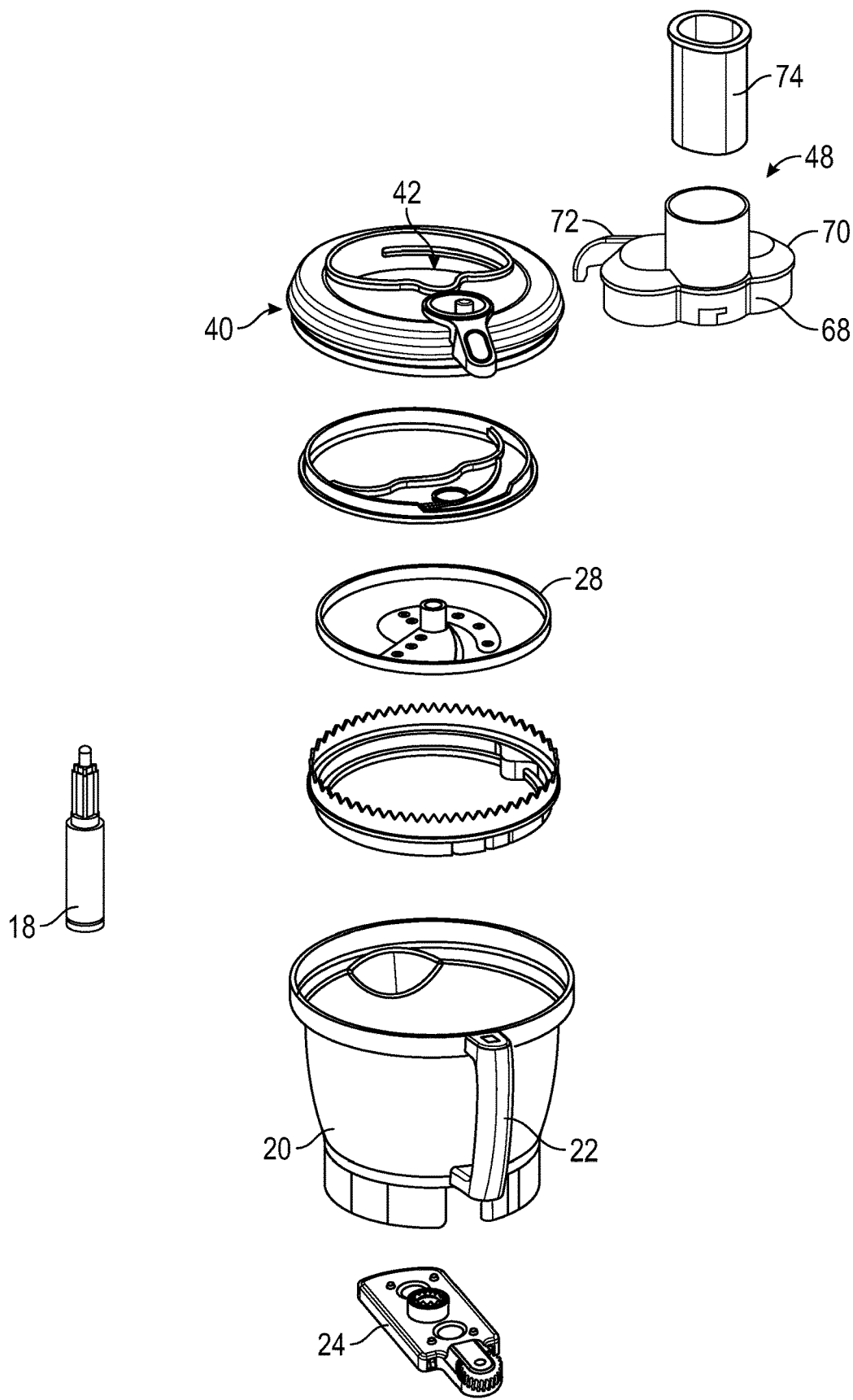
FIG. 8 is an exploded, perspective view of the food processing bowl, modular lid and spiral feed tube of FIG. 7.

Referring now to FIGS. 7 and 8, the modular lid 40 is shown in use with the spiral feed tube 48. Like the flat cover 44 and large feed tube 46, the spiral feed tube 48 has a lower portion 68 sized and shaped to be received in the opening 42 in the lid 40, and a peripheral flange 70 that contacts the top surface of the lid 40 to prevent the spiral feed tube 48 from falling into the bowl 20. A generally cylindrical opening extends through the spiral feed tube 48 to allow for the insertion of food items to be processed. The spiral feed tube 48 similarly includes an optical channel 72 that is configured to align with the optical channel 31 on the periphery of the bowl 20 to establish the "optical interlock" in the manner discussed above.

In connection with the optical interlock feature described above, the optical sensor that receives the optical signal indicating that the components are all in locked and proper position may be positioned either in the base (in which case the optical signal is reflected by the lid attachment/cover/feed tube), or in the lid attachment/cover/feed tube itself.

As illustrated in FIGS. 1, 2, 7 and 8, the spiral feed tube 48 includes a pusher 74 that is sized and shaped so as to be slidably received by the cylindrical opening in the feed tube 48 and may be utilized to push food items through the feed tube 48 and into the spiral cutter 38 within the bowl 20. Like the pushers of the large feed tube, pusher 74 has a flange at the top thereof that prevents the pusher from falling through the opening in the spiral feed tube 48 and into the bowl 20.

In an embodiment, the lid 40 may include a pushbutton release that may be activated by a user to release the flat cover 44, large feed tube 46 or spiral feed tube 48 from engagement with the lid 40.

The modular lid 40 of the present invention therefore allows a user to configure the lid 40 in dependence upon the particular processing operation to be carried out as well as the size of the food items to be processed. For example, for blending operations the lid 40 may be fully closed off by utilizing the flat cover 44. When spiral cutting, the spiral feed tube 48 may be utilized. In addition, during standard food processing operations, the large feed tube 46 may be attached to the lid 40. In connection with such standard processing, the feed tube opening may be selectively varied by a user by using one or more of the nestable pushers, in order to more closely match the size of food items to be processed. The ability to tailor the size of the feed tube opening to the size of food items to be processed improves processing performance, as a whole.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A food processor, comprising:
a base;
a motor disposed within said base;
a drive shaft operatively connected to said motor and extending outwardly from said base, said output shaft being rotatable upon actuation of said motor;
a bowl mounted on said base for containing food items;
a modular lid for covering said bowl and having an opening therein; and
a removable attachment receivable by said opening;
said removable attachment comprising a feed tube includes a nestable pusher assembly including a first pusher nestable within and removable from said feed tube, said first pusher having a first flange at a top portion thereof, a second pusher nestable within and removable from said first pusher, said second pusher having a second flange at a top portion thereof, and a third pusher nestable within and removable from said second pusher, said third pusher having a third flange at a top portion thereof;
wherein said first pusher is removable from said feed tube when said removable attachment is received by said opening and said modular lid is mounted to said bowl;
wherein the first flange, the second flange, and the third flange prevent the first pusher, the second pusher, and the third pusher, respectively, from falling into the bowl in a nested configuration; and
wherein said bowl includes an optical channel configured to receive an optical signal and establish an optical interlock with the base.

2. The food processor of claim 1, wherein:
said removable attachment is one of a cover configured to completely close off said opening, said feed tube having a generally oval feed tube aperture and a spiral feed tube having a generally cylindrical feed tube aperture.

3. The food processor of claim 2, wherein:
said first pusher has a first pusher aperture therethrough and said second pusher has a second pusher aperture therethrough;
wherein said feed tube aperture has a greater cross-sectional area than said first pusher aperture; and
wherein said first pusher aperture has a greater cross-sectional area than said second pusher aperture.

4. The food processor of claim 2, wherein:
each of said feed tube and said spiral feed tube include an optical channel configured to establish an optical interlock with the optical channel on the bowl when said modular lid is received atop said bowl and said cover, said feed tube and said spiral feed tube, respectively, are received by said opening in said modular lid.

5. The food processor of claim 2, further comprising:
a pushbutton positioned on said modular lid and being selectively actuatable to release said cover, said feed tube or said spiral feed tube from engagement with said modular lid.

6. The food processor of claim 1, wherein:
said opening is generally oval in shape.

7. The food processor of claim 1, further comprising:
a processing implement mounted to said drive shaft within said bowl.

8. A modular lid for a food processor, comprising:
a body configured to be received atop a bowl;
an opening formed in said body and being configured to allow passage of food items into said bowl, said opening being further configured to removably receive one of a cover configured to completely close off said opening, a feed tube having a generally oval feed tube aperture, and a spiral feed tube having a generally cylindrical feed tube aperture;
wherein said feed tube includes a nestable pusher assembly including a first pusher nestable within and removable from said feed tube, said first pusher having a first flange at a top portion thereof, a second pusher nestable within and removable from said first pusher, said second pusher having a second flange at a top portion thereof, and a third pusher nestable within and removable from said second pusher, said third pusher having a third flange at a top portion thereof;
wherein said first pusher is removable from said feed tube responsive to said body being received atop said bowl and said first pusher is aligned for movement within said feed tube; wherein the first flange, the second flange, and the third flange prevent the first pusher, the second pusher, and the third pusher, respectively, from falling into the bowl in a nested configuration; and
wherein said bowl and said cover include optical channels configured to receive an optical signal and establish an optical interlock with generated by a control unit in the base.

9. The modular lid of claim 8, wherein:
said modular lid is generally oval in shape.

10. The modular lid of claim 8, wherein:
said first pusher has a first pusher aperture therethrough and said second pusher has a second pusher aperture therethrough;
wherein said feed tube aperture has a greater cross-sectional area than said first pusher aperture; and
wherein said first pusher aperture has a greater cross-sectional area than said second pusher aperture.

11. The modular lid of claim 8, wherein:
each of said cover, said feed tube and said spiral feed tube include an optical channel configured to establish an optical interlock with a corresponding optical channel on the bowl when said modular lid is received atop said bowl and said cover, said feed tube and said spiral feed tube, respectively, are received by said opening in said modular lid.

12. The modular lid of claim 8, further comprising:
a pushbutton, said pushbutton being selectively actuatable to release said cover, said feed tube or said spiral feed tube from engagement with said modular lid.

13. A food processor, comprising:
a base;
a motor disposed within said base;
a drive shaft operatively connected to said motor and extending outwardly from said base, said output shaft being rotatable upon actuation of said motor;
a bowl mounted on said base for containing food items;
a modular lid for covering said bowl and having an opening therein;
a housing including a feed tube opening for selectively accommodating a first pusher assembly, said first pusher assembly being selectively removable from said housing when said modular lid is mounted on said bowl and said first pusher assembly is aligned with said feed tube opening, said first pusher having a first flange at a top portion thereof;
a second pusher assembly removably nested within a first feed tube, said second pusher having a second flange at a top portion thereof, and a third pusher assembly removably nested within said second pusher assembly, said third pusher having a third flange at a top portion thereof; wherein the first flange, the second flange, and the third flange prevent the first pusher, the second pusher, and the third pusher, respectively, from falling into the bowl in a nested configuration; and
wherein said bowl and said modular lid include optical channels configured to receive an optical signal and establish an optical interlock with generated a control unit in the base.

* * * * *